United States Patent [19]

Harris

[11] Patent Number: 5,603,349
[45] Date of Patent: Feb. 18, 1997

[54] TANK VENTING SYSTEM

[75] Inventor: Robert S. Harris, Connersville, Ind.

[73] Assignee: Stant Manufacturing Inc., Connersville, Ind.

[21] Appl. No.: 385,670

[22] Filed: Feb. 8, 1995

Related U.S. Application Data

[60] Continuation-in-part of Ser. No. 209,717, Mar. 14, 1994, Pat. No. 5,388,611, which is a division of Ser. No. 822,616, Jan. 17, 1992, Pat. No. 5,318,069.

[51] Int. Cl.$^6$ .................................................. F16K 24/00
[52] U.S. Cl. ........................... 137/588; 137/110; 123/519
[58] Field of Search .................................. 137/588, 110, 137/39, 907, 854; 123/519, 521

[56] References Cited

U.S. PATENT DOCUMENTS

| | | |
|---|---|---|
| 4,714,172 | 12/1987 | Morris . |
| 4,742,809 | 5/1988 | Ito et al. . |
| 4,770,677 | 9/1988 | Harris . |
| 4,790,349 | 12/1988 | Harris . |
| 4,816,045 | 3/1989 | Szlaga et al. . |
| 4,836,835 | 6/1989 | Harris et al. . |
| 4,887,578 | 12/1989 | Woodcock et al. . |
| 4,944,779 | 7/1990 | Szlaga et al. . |
| 4,953,583 | 9/1990 | Szlaga . |
| 5,028,244 | 7/1991 | Szlaga . |
| 5,029,722 | 7/1991 | Bollinger et al. . |
| 5,065,782 | 11/1991 | Szlaga . |
| 5,099,880 | 3/1992 | Szlaga et al. . |
| 5,156,178 | 10/1992 | Harris . |
| 5,234,013 | 8/1993 | Roetker et al. . |
| 5,318,069 | 6/1994 | Harris . |
| 5,327,934 | 7/1994 | Thompson .............................. 123/519 |
| 5,388,611 | 2/1995 | Harris ..................................... 137/588 |
| 5,417,240 | 5/1995 | Benjey .................................... 123/519 |
| 5,462,100 | 10/1995 | Covert et al. . |

Primary Examiner—James Larson
Attorney, Agent, or Firm—Barnes & Thornburg

[57] ABSTRACT

A tank venting system includes first and second tank valves and a valve for controlling venting from valves to vapor recovery canister. The valve includes a housing containing a first valve assembly for controlling venting of the first tank valve and a second valve assembly for controlling venting of the second tank valve. A vent conduit defines a bleed passageway for dissipating pressurized fuel vapor in a housing flow tube to a filler neck through a signal port and a passageway. A tube includes a vacuum-relief passageway and a valve for regulating flow of ambient air from the signal passageway into the housing when a cap is off the filler neck.

35 Claims, 6 Drawing Sheets

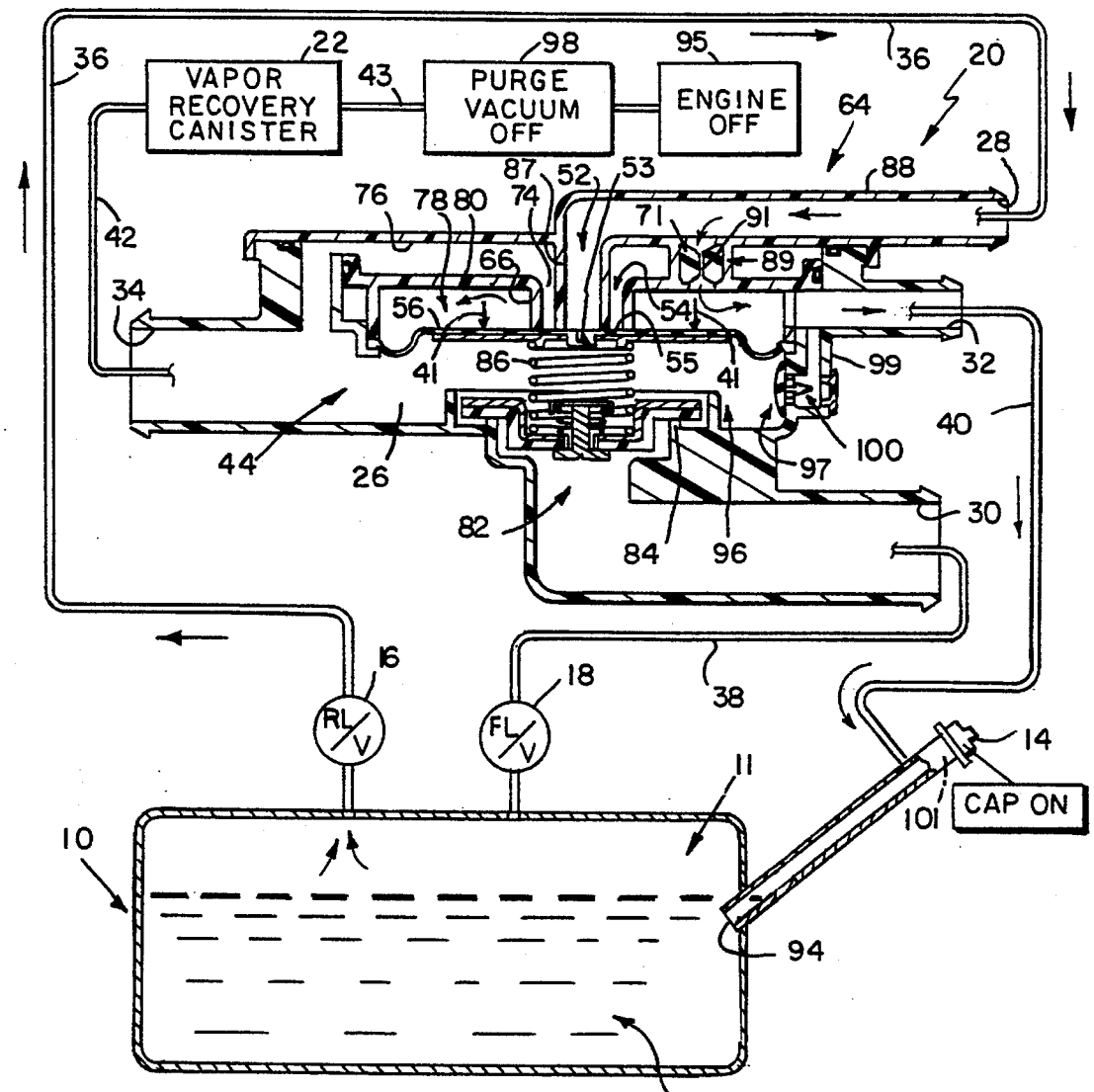
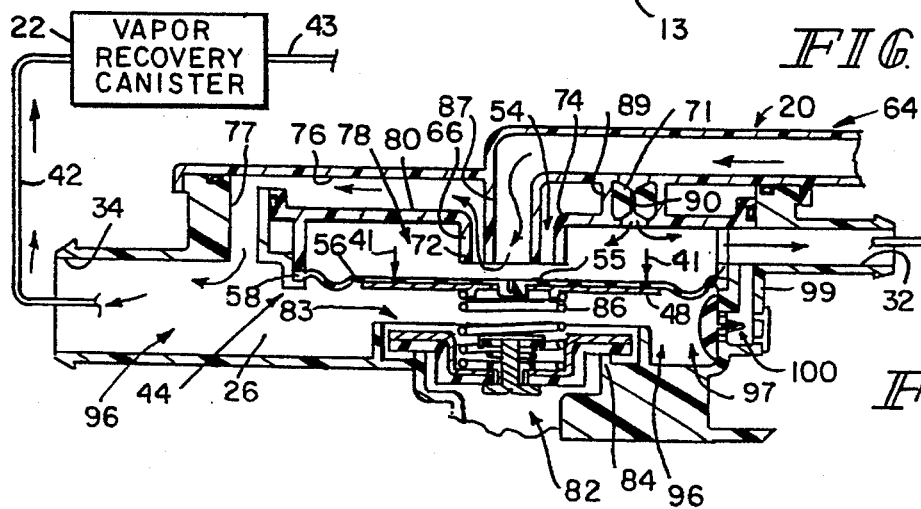
FIG. 5
FIG. 5a

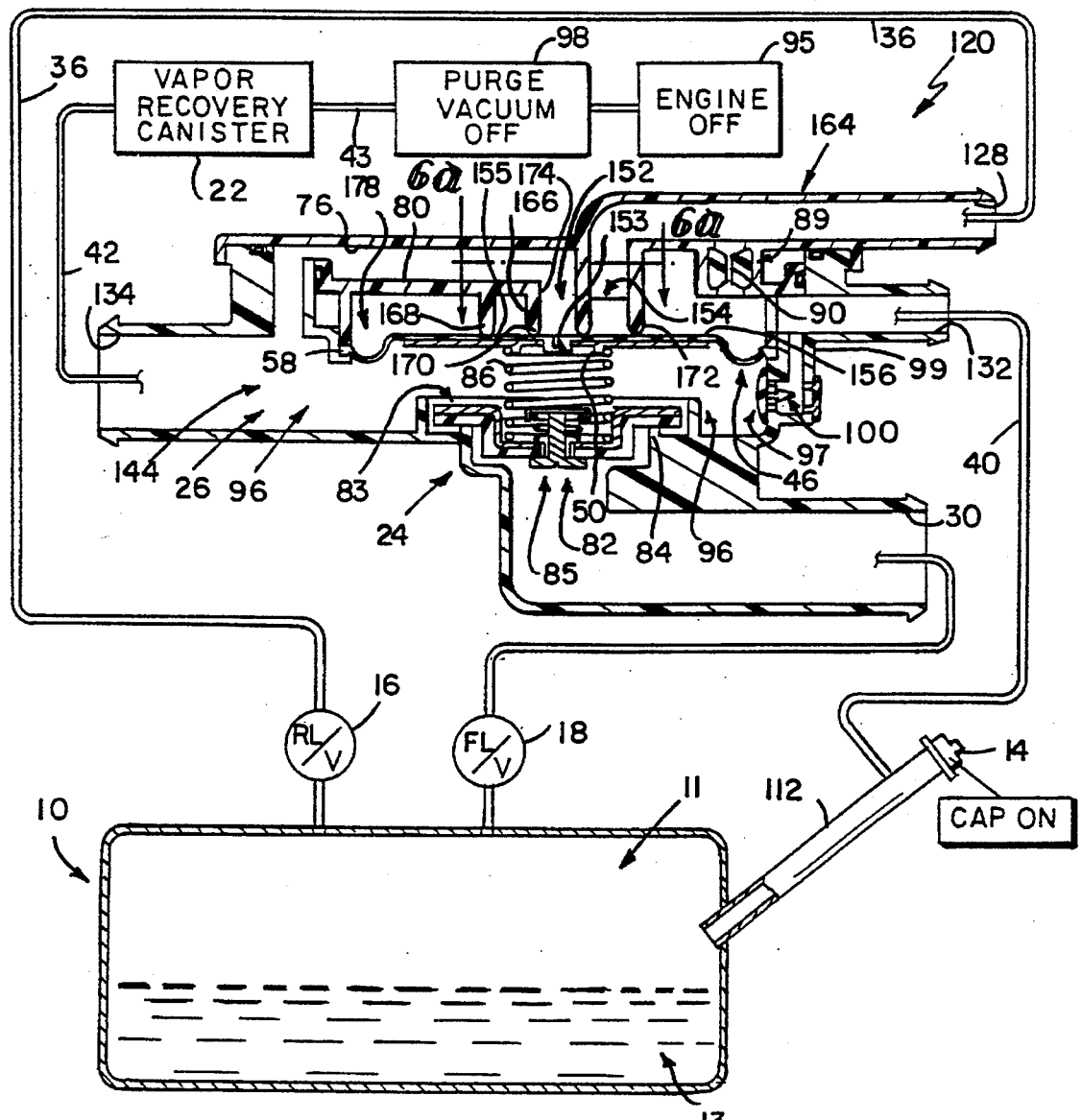

TANK VENTING SYSTEM

BACKGROUND AND SUMMARY OF THE INVENTION

This application is a continuation-in-part of U.S. application Ser. No. 08/209,717, filed Mar. 14, 1994, now U.S. Pat. No. 5,388,611, which is a division of U.S. application Ser. No. 07/822,616, filed Jan. 17, 1992, now U.S. Pat. No. 5,318,069.

The present invention relates to systems for controlling venting of fuel vapors from a vehicle fuel tank, and particularly a tank venting control valve assembly. More particularly, the present invention relates to a tank venting control valve for controlling flow of fuel vapor from tank-mounted run-loss and fill-limit valves to a fuel vapor recovery canister on-board a vehicle.

It is well understood that significant quantities of fuel vapor can escape from a fuel tank through the filler neck to the atmosphere during the refueling of motor vehicles. Early attempts to control the vapor escape focused upon control devices fitted to the fuel-dispensing nozzle. Later, control devices mounted directly on-board the vehicle (and thus referred to as "On-board refueling vapor recovery" systems or "ORVR" systems) were developed. See, for example, U.S. Pat. No. 4,944,779 to Szlaga et al, relating to a vapor recovery system mounted on the fuel tank filler neck. ORVR systems which mount to a fuel tank have also been developed as shown, for example, in U.S. Pat. No. 5,156,178 to Harris.

In addition to controlling vapor escape, well-designed ORVR systems also assist in controlling the amount of liquid fuel which can be pumped into the fuel tank during refueling. For safety reasons, fuel systems are designed so that the fuel tank is never completely filled with liquid fuel. Rather, at least a predetermined portion of the space inside the fuel tank is left for liquid fuel and fuel vapor expansion. Although fuel pump nozzles typically include sensors for shutting of the flow of liquid fuel into the fuel tank when the fuel tank is nearly filled, fuel pump users may manually override the sensors by continuing to pump fuel after the sensors have automatically shut the pump nozzle off. To assist in preventing tank overfill under such conditions, the ORVR system is usually provided with a "fill-limit" valve which prevents the escape of vapor through the ORVR system, and thus assists in triggering the nozzle shut-off mechanism when the level of liquid fuel in the fuel tank has risen to a predetermined level.

It has also long been recognized that fuel vapor is generated in the fuel tank during operation of the vehicle, for example, by evaporation or by sloshing of the liquid fuel against the walls of the tank. Excessive pressure can built up in the fuel tank as a result of the newly formed fuel vapor unless control devices are provided to vent the fuel vapor from the fuel tank during vehicle operation. Such valves have been referred to as "run-loss" valves or tank-venting rollover valves because they handle fuel vapor loss during vehicle run and are capable of preventing liquid fuel carry-over during vehicle rollover.

Coincident with developing ORVR systems to handle venting of fuel vapor during refueling, fuel systems engineers pursued advancements in tank pressure control systems, particularly run-loss valves for venting the fuel tank during vehicle operation. One driving force behind such advancements was the need to provide run-loss valves having very large flow capacities. For example, prior valves typically had flow orifices in the range of 0.050 inch diameter or smaller. Current valves might have flow orifice diameters as large as 0.290 inch (0.114 cm).

Presumably, one might wish to use a high-flow capacity run-loss valve with, for example, a tank-mounted ORVR system including fill-limit control to provide a comprehensive vapor recovery and pressure-control system. But it is contemplated that a parallel arrangement of the run-loss valve with the ORVR system would prove unacceptable because the two tend to work at odds with one another in controlling overfill of the fuel tank.

During refueling of a fuel tank provided with a parallel arrangement of a run-loss valve and an ORVR system, the fill-limit control valve in the ORVR system will close off the ORVR system, preventing further escape of fuel vapor, when a predetermined amount of liquid fuel has been pumped into the tank. However, the high-flow capacity run-loss valve will tend to remain open, continuing to allow escape of fuel vapor and thus allowing additional liquid fuel to be pumped into the fuel tank. It would thus be desirable to provide a tank venting and vapor recovery system capable of selectively providing venting through either a run-loss valve or an ORVR valve while properly preventing tank overfill.

According to the present invention, an apparatus is provided for controlling venting of fuel vapors from a vehicle fuel tank having a filler neck. The apparatus is particularly suited for controlling venting of fuel vapor from a first vent valve (for example, a run-loss valve) and a second vent valve (for example, a fill-limit valve).

In particular, the fuel vapor vent control apparatus comprises a housing defining an interior region. The housing is formed to include first and second inlet ports connecting the interior region in fluid communication with the fuel tank. The housing is also formed to include a signal port connecting the interior region in fluid communication with the filler neck and an outlet port.

The fuel vapor vent control apparatus further includes a first valve assembly movable between a blocking position and a venting position. When moved to its blocking position, the first valve assembly prevents fuel vapor received from the first inlet port from flowing through the interior region of the housing during vehicle refueling. When positioned in the venting position, the first valve assembly allows fuel vapor received from the first inlet port to flow through the interior region of the housing to the outlet port during vehicle operation.

The fuel vapor vent control apparatus further includes several chambers in the interior region of the housing such as a central chamber communicating with the central portion of the first valve assembly, an outer circumferential chamber communicating with the outer circumferential portion of the first valve assembly and with the signal port, and an intermediate annular chamber communicating with the intermediate annular portion of the first valve assembly and lying between the central chamber and the outer circumferential chamber. A flow tube is provided for connecting the inlet port of the housing with a predetermined portion of the first valve assembly to expose the first valve assembly to fuel vapor from the fuel tank.

The fuel vapor vent control apparatus further includes a vent system defining a bleed passageway connecting the flow tube in fluid communication with the outer circumferential chamber so that pressurized fuel vapor coming from the fuel tank and accumulating in the flow tube is dissipated through the bleed passageway and discharged into the outer circumferential chamber. Under normal engine-running conditions, the bleed passageway will communicate pressurized fuel vapor from the fuel tank to the outer circumferential chamber to "pressurize" that chamber, causing the first valve assembly to move from its blocking position to its venting position.

In a first embodiment, an outlet end of the flow tube is connected to the central chamber and the intermediate annular chamber is connected to the outlet port. In a second embodiment, the outlet end of the flow tube is connected to the intermediate annular chamber and the central chamber is connected to the outlet port.

In preferred embodiments, the flow tube is an L-shaped member having a first leg communicating with the central chamber and a second leg connecting to the first leg and communicating with the first inlet port. The vent system is a tube that is formed to include the bleed passageway and connect the second leg and the outer circumferential chamber in fluid communication. One advantage of bleed passageway is that it communicates tank pressure to the outer circumferential chamber during normal engine-running conditions even if liquid fuel or a valve in the filler neck blocks such tank pressure from reaching the outer circumferential chamber along a path defined, in part, by the filler neck and signal port.

Also in preferred embodiments, the fuel vapor vent control apparatus further includes an exhaust system for conducting fuel vapor from the outlet port of the housing to the fuel vapor recovery canister and a connector for connecting the signal port in fluid communication with the interior region of the housing and the outlet port. Illustratively, the connector includes a vacuum-relief tube formed to include a vacuum-relief passageway interconnecting the signal port and the interior region of the housing and a vacuum-relief valve mounted in the housing normally to cover the vacuum-relief passageway. The vacuum-relief valve is illustratively an umbrella valve that is movable to open and close the vacuum-relief passageway.

In use, the vacuum-relief valve in the connector moves to its open position whenever certain vacuum conditions develop in an outlet portion of the interior region of the housing communicating with the outlet port. For example, vacuum conditions could develop in such an outlet portion after fuel tank refueling is complete if the vehicle engine is running while the cap is not mounted on the filler neck. Typically, vacuum is applied to an onboard vapor recovery canister by a purge vacuum source whenever the engine is running in an effort to suck fuel contained in the vapor recovery canister into the engine for combustion. The vacuum that is applied to the vapor recovery canister is also applied to the outlet portion of the interior region of the housing through a fuel vapor transmission line interconnecting the vapor recovery canister and the outlet port.

Unwanted vacuum in the outlet portion of the interior region of the housing operates to "open" the vacuum-relief valve in the connector so that ambient air provided to the signal port through a signal passageway connected to the filler neck at a point near the open mouth of the filler neck can enter the outlet portion of the interior region of the housing to dissipate any vacuum therein. This vacuum dissipation feature advantageously relieves any unwanted vacuum created in the outlet portion of the interior region of the control apparatus housing by operation of an engine-driven vapor recovery canister purge vacuum source.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 5 is a view similar to FIGS. 1–4 showing venting of some fuel tank vapor through the run-loss valve (RL/V) and the bleed passageway to an outer circumferential chamber above the differential pressure diaphragm so as to "pressurize" that outer circumferential chamber after refueling has been completed, the level of liquid fuel in the fuel tank has risen to a level covering the filler neck outlet, the cap has been reinstalled on the filler neck, and the vehicle engine is off;

FIG. 5a is a partial view of the control valve illustrated in FIG. 5 showing how pressurized fuel vapor discharged from the fuel tank into the outer circumferential chamber through the bleed passageway moves the differential pressure valve from a closed position shown in FIG. 5 to a venting position allowing pressurized fuel vapor to vent past the differential pressure diaphragm to the vapor recovery canister;

FIG. 6 is a sectional detail view of a second embodiment of a tank venting system in accordance with the present invention during conditions similar to that shown in FIG. 1; and FIG. 6a is a partial sectional view of a portion of the tank venting system of FIG. 6 showing a flow tube extending into an intermediate annular portion of a first valve assembly to conduct fuel vapor pressure from the fuel tank thereto.

DETAILED DESCRIPTION OF THE DRAWINGS

Figure 1:
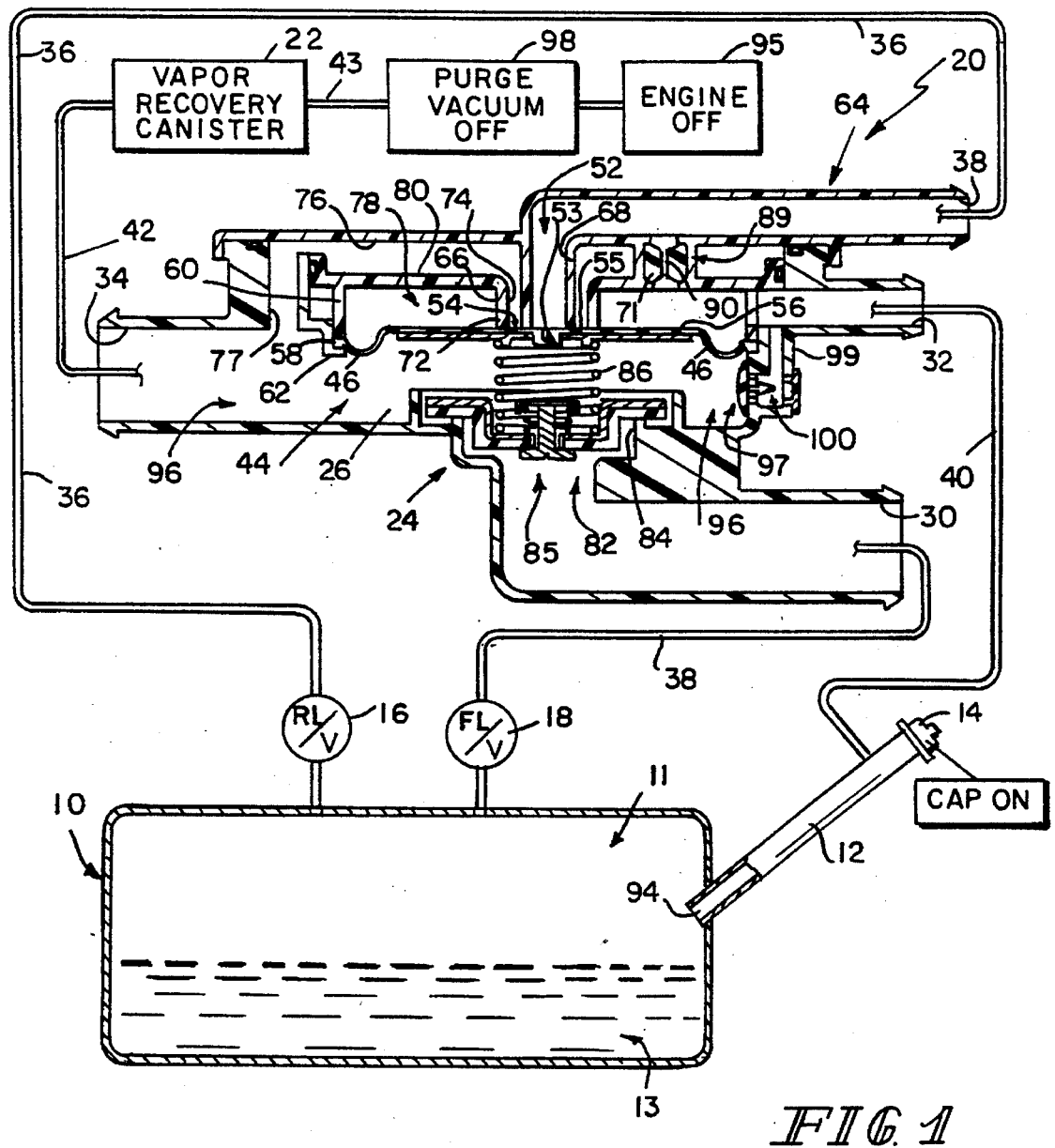
FIG. 1 is a sectional side view of a first embodiment of a tank venting system in accordance with the present invention when the vehicle containing the tank venting system is stationary and the vehicle engine is off and showing no venting of fuel tank fuel vapor to a vapor recovery canister through either a run-loss valve (RL/V) or a fill-limit valve (FL/V) and showing a control valve having a valve housing and a differential pressure diaphragm movable in the valve housing.

A preferred embodiment of a fuel tank venting and vapor recovery system in accordance with the present invention is illustrated in FIG. 1. The system is operable to control venting and vapor recovery from a vehicle fuel tank 10 having a filler neck 12. A fuel cap 14 sealingly engages the upper end of filler neck 12 during normal vehicle operation.

The tank venting and vapor recovery system includes a run-loss valve 16, a fill-limit valve 18, and a control valve 20 for controlling venting from the run-loss valve 16 and the fill-limit valve 18 respectively. Control valve 20 is connected to a fuel vapor recovery device 22, which may be a carbon canister or other art-recognized device.

Run-loss valve 16 is typically a valve of the type shown, for example, in U.S. Pat. No. 5,028,244 to Szlaga or U.S. Pat. No. 5,065,782 to Szlaga, relevant portions of which are incorporated by reference herein. Run-loss valve 16 functions to vent substantial volumes of fuel vapor from the fuel tank during vehicle operation to maintain appropriate operating pressure in the fuel tank 10. As those of ordinary skill in the art will appreciate, run-loss valve 16 may be one of a variety of commercially available run-loss valves.

Fill-limit valve 18 may be of the type disclosed in Robert S. Harris' U.S. patent application Ser. No. 08/241,186, entitled "Fill Limit Valve Assembly" and filed May 11, 1994 or in U.S. Pat. No. 5,234,013 to Roetker et al. Fill-limit valve 18 rises on rising liquid fuel and closes at a predetermined liquid fuel level, thereby preventing additional fuel vapor from venting through control valve 20. This creates a vapor blanket or pressure head in a vapor space 11 above the liquid fuel 13 in fuel tank 10 which acts to force fuel up filler neck 12 at the proper point during vehicle refueling to trigger a fuel nozzle shut-off device (not shown).

Control valve 20 includes a housing 24 which defines an interior region 26. Housing 24 is formed to include a first inlet port 28, a second inlet port 30, a signal port 32, and an outlet port 34. A vapor inlet passageway 36 extends between run-loss valve 16 and first inlet port 28 and cooperates with first inlet port 28 to connect interior region 26 of housing 24 in fluid communication with fuel tank 10. Vapor inlet passageway 36 and first inlet port 28 thus serve as first means for conducting fuel vapor from fuel tank 10 to interior region 26 of valve housing 24.

Likewise, a vapor inlet passageway 38 extends between fill-limit valve 18 and second inlet port 30 and cooperates with second inlet port 30 to connect interior region 26 in fluid communication with fuel tank 10. Vapor inlet passageway 38 and second inlet port 30 thus serve as second means for conducting fuel vapor from fuel tank 10 to interior region 26 of valve housing 24.

Signal port 32 connects interior region 26 of valve housing 24 to filler neck 12 by way of a signal passageway 40. Signal passageway 40 and signal port 32 together provide third means for conducting fuel vapor from the filler neck 12 to interior region 26 of valve housing 24 to assist in actuating control valve 20 as described below.

A vapor outlet passageway 42 extends between outlet port 34 and vapor recovery canister 22. Because vapor recovery canister 22 is exposed to atmospheric pressure through line 43, vapor outlet passageway 42, and any portion of interior region 26 connected via outlet port 34 in fluid communication therewith, is also exposed to atmospheric pressure.

A first valve assembly 44 is disposed in interior region 26 of valve housing 24 as shown in FIG. 1. First valve assembly 44 is movable between a blocking position (FIG. 1) preventing fuel vapor received from first inlet port 28 from flowing through interior region 26 to outlet port 34 and a venting position (FIG. 2) allowing fuel vapor received from first inlet port 28 to flow through interior region 26 to outlet port 34, and subsequently through outlet passageway 42 to vapor recovery canister 22. Thus, first valve assembly 44 serves as first valve means for selectively blocking flow of fuel vapors from first vapor inlet passageway 36 and first vapor inlet port 28 through interior region 26.

First valve assembly 44 includes a flexible diaphragm 46 and a backing plate 48 appended to diaphragm 46 for movement therewith. Backing plate 48 includes a downwardly extending spring mount 50. As shown in FIG. 1, control valve 20 also includes a central chamber 52 corresponding to the central portion 53 of diaphragm 46, an intermediate annular chamber 54 concentric with central chamber 52 and corresponding with the intermediate portion 55 of diaphragm 46, and an outer circumferential chamber 78 corresponding with the outer circumferential portion 56 of diaphragm 46. Diaphragm 46 is mounted in interior region 26 by its peripheral edge 58 which is sandwiched between portions of an upper wall 60 of housing 24 and a lower wall 62 thereof.

One important advantage of the embodiment of the invention illustrated in FIG. 1 is that it provides a concentric venting flow path for venting of fuel vapor received at first inlet port 28 from fuel tank 10 by way of run-loss valve 16. In the concentric venting flow path, central portion 53 is exposed to fuel vapor pressure from fuel tank 10 via first inlet port 28, outer circumferential portion 56 is exposed to fuel vapor pressure from filler neck 12 via signal port 32, and intermediate portion 55 is exposed to atmospheric pressure from vapor recovery canister 22 via outlet port 34. The concentric flow path is effected by cooperation between a flow tube 64, an annular partition 66, walls 60 and 62 of housing 24, and diaphragm 46 itself.

In particular, flow tube 64 connects first inlet port 28 of valve housing 24 with central portion 53 of diaphragm 46 to expose central portion 53 to fuel vapor pressure exhausted from fuel tank 10 and passing thereafter through run-loss valve 16 and first vapor inlet passageway 36 to reach first inlet port 28. Flow tube 64 is preferably of relatively large diameter, for example, 0.290 inch (0.114 cm) to handle the large volumes of fuel vapor exhausted from fuel tank 10 through run-loss valve 16. Flow tube 64 terminates in a first valve seat 68 against which diaphragm 46 seats when first valve assembly 44 is in its blocking position as illustrated in FIG. 1. For purposes of describing this embodiment of the invention, first valve seat 68 defines the border between central portion 53 and intermediate portion 55.

Annular partition 66 lies in spaced-apart relationship with flow tube 64 and surrounds it so as to define the intermediate annular chamber 54 therebetween. Annular partition 66 terminates in a second valve seat 72 defining the border between intermediate portion 55 and outer circumferential portion 56.

Annular partition 66 also is formed to include an opening 74 placing intermediate annular chamber 54 in fluid communication with an outlet tube 76 which in turn is linked to outlet port 34 through opening 77. Because intermediate annular chamber 54 is thus open to and in fluid communication with outlet port 34, intermediate annular chamber 54 and, correspondingly, intermediate portion 55 of diaphragm 46, are exposed to atmospheric pressure conducted through vapor recovery canister 22 and outlet passageway 42.

Annular partition 66 also cooperates with valve housing 24 to define the outer circumferential chamber 78 as shown in FIG. 1. Outer circumferential chamber 78 is bordered by walls 60, 62 of housing 24, and a top wall 80 thereof, as well as by annular partition 66 and outer circumferential portion 56 of diaphragm 46. Outer circumferential chamber 78 is open to and in fluid communication with signal port 32 so that outer circumferential chamber 78, and outer circumferential portion 56 of diaphragm 46, are exposed to fuel vapor pressure from filler neck 12 conducted through signal passageway 40. As described below, this fuel vapor pressure signal from filler neck 12 acts upon outer circumferential portion 56 to move diaphragm 46 from its blocking position (FIG. 1) toward its venting position (FIG. 2), allowing venting to occur during vehicle operation to regulate pressure in fuel tank 10 properly.

Figure 3:
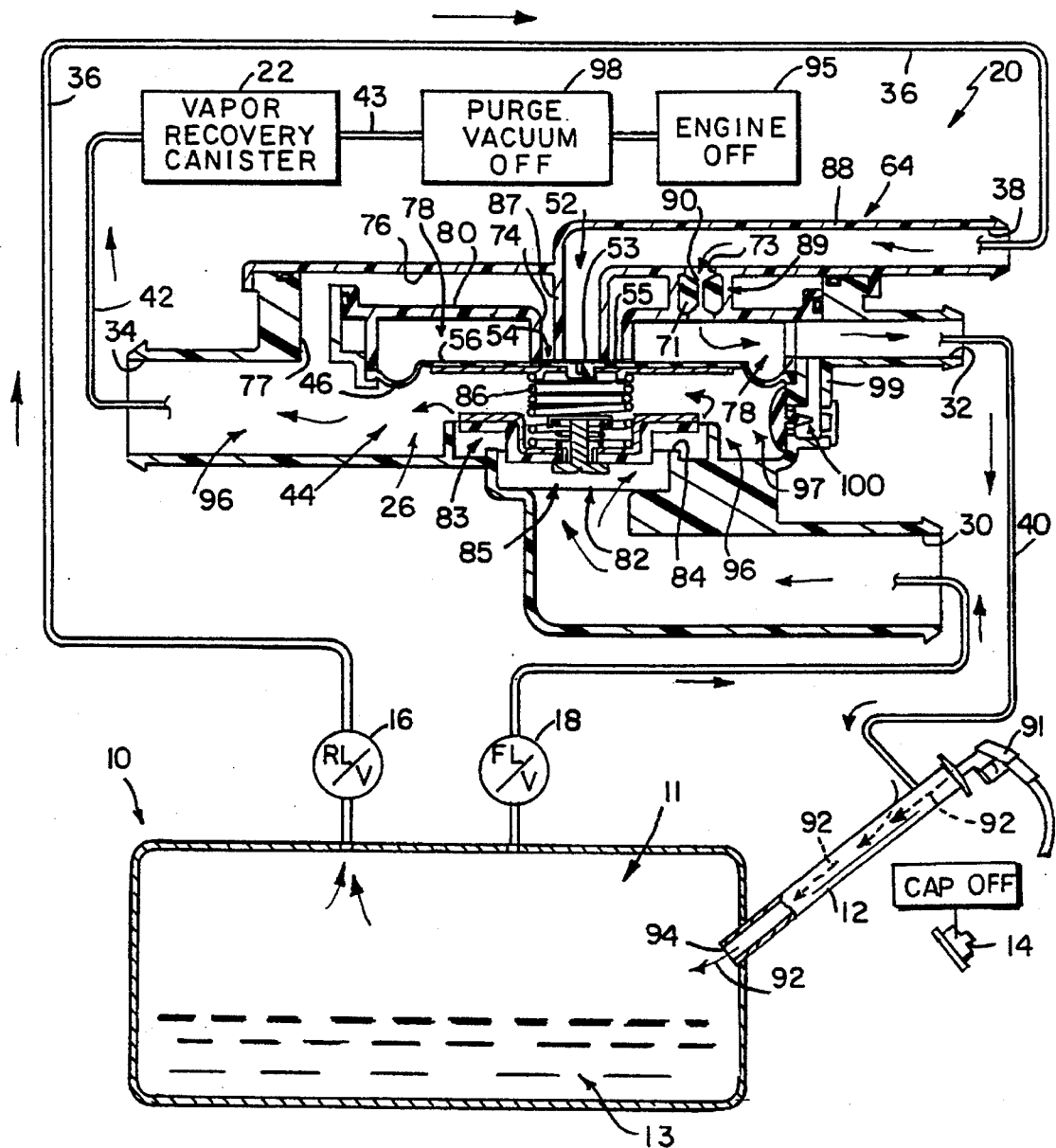
FIG. 3 is a view similar to FIGS. 1 and 2 showing a normal refueling condition in which fuel vapor vents from the fuel tank to the vapor recovery canister through a fill-limit valve (FL/V) and a lower path below the differential pressure diaphragm past a pressure-relief valve positioned to move inside the valve housing of the control valve and showing some venting of fuel tank vapor through the run-loss valve (RL/V) and a bleed passageway in the control valve to the filler neck during refueling.

A second valve assembly 82 is positioned in interior region 26 below first valve assembly 44 as shown in FIG. 1 to provide an on-board refueling vapor recovery function during vehicle refueling as shown in FIG. 3. Second valve assembly 82 includes a pressure-relief valve 83 positioned for sealing engagement with a valve seat 84 and a vacuum-relief valve 85 mounted in an aperture formed in the pressure-relief valve 83. Second valve assembly 82 is movable between a blocking position (illustrated in FIG. 1) preventing fuel vapor received from through second inlet port 30 from flowing through interior region 26 and a venting position (illustrated in FIG. 3) allowing fuel vapor received through second inlet port 30 to flow through interior region 26 to outlet port 34. Second valve assembly 82 thus serves as second valve means for selectively blocking flow of fuel vapor from second inlet passageway 38 and second inlet port 30 to interior region 26 of valve housing 24.

Advantageously, a spring 86 extends between second valve assembly 82 and backing plate 48 to serve as means for biasing second valve assembly 82 in opposition to first valve assembly 44. Spring 86 assists in maintaining second valve assembly 82 in its blocking position when first valve assembly 44 moves to its venting position, thus allowing control valve 20 to vent fuel tank vapor to vapor recovery canister 22, either through first valve assembly 44 during vehicle operation or through second valve assembly 82 during vehicle refueling. Illustratively, spring 86 is a coiled compression spring 86 having one end contacting backing plate 48 and another end contacting a backing plate included in pressure-relief valve 83 as shown in FIG. 1.

Figure 2:
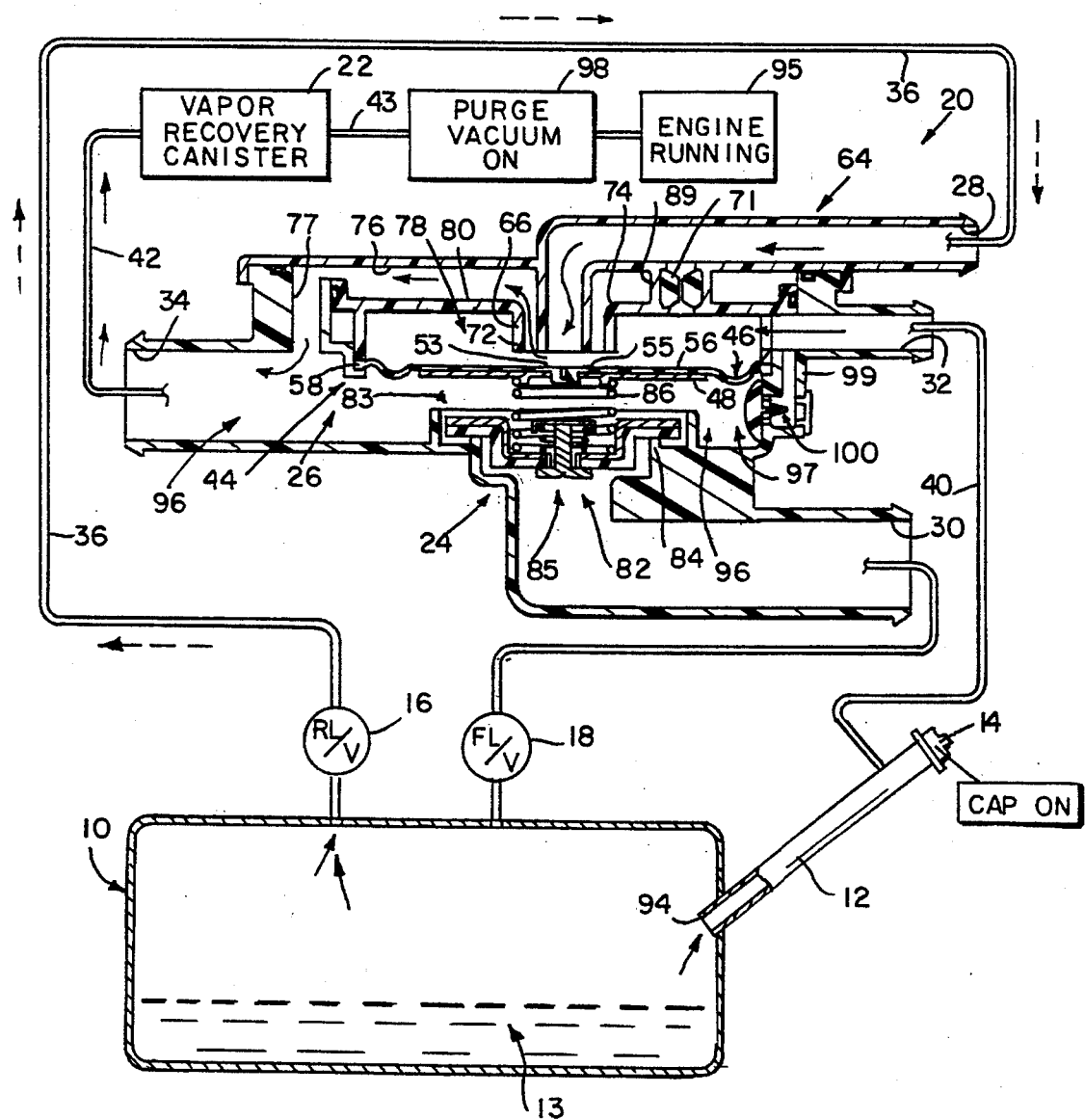
FIG. 2 is a view similar to FIG. 1 showing the tank venting system of FIG. 1 in a normal engine-running condition in which pressurized fuel vapor vents from the fuel tank to the vapor recovery canister through a run-loss valve (RL/V) and an upper path above the differential pressure diaphragm positioned to move inside the valve housing of the control valve.

In operation, the embodiment of the invention illustrated in FIG. 1 provides selective venting to a vapor treatment site in vapor recovery canister 22 through either run-loss valve 16 or fill-limit valve 18 by venting fuel vapor through either first valve assembly 44 or second valve assembly 82. In FIG. 1, control valve 20 is shown in a static configuration in which both first valve assembly 44 and second valve assembly 82 are in their respective fuel vapor-blocking positions. It will be appreciated that during vehicle operation, first valve assembly 44 normally is positioned in its venting position, as shown in FIG. 2, holding second valve assembly 82 in its blocking position. During vehicle refueling, the opposite configuration is reached; that is, second valve assembly 82 is moved to its venting position as shown in FIG. 3, thereby assisting in holding first valve assembly 44 in its blocking position.

Specifically, as shown in FIG. 2, during normal vehicle operation with fuel cap 14 securely mounted on filler neck 12, pressurized fuel vapor from fuel tank 10 can pass through run-loss valve 16 and through vapor inlet passageway 36 to reach first inlet port 28, from which it passes through flow tube 64 to impinge upon the relatively small central portion 53 of diaphragm 46. At the same time, fuel vapor pressure from the upper portion of filler neck 12 travels through signal passageway 40, passing through signal port 32 to reach outer circumferential chamber 78. Although the fuel vapor from filler neck 12 is likely to be at a pressure slightly less than tank pressure, the fuel vapor acts across the relatively large outer circumferential portion 56 of diaphragm 46 in outer circumferential chamber 78. It is thought that the filler neck pressure is likely to be less than tank pressure, at least when the fuel tank 10 is filled with liquid fuel 13, because some pressure is lost when liquid fuel 13 is lifted up filler neck 12 by pressure conditions in fuel tank 10.

Additionally, the underside of diaphragm 46 is exposed to atmospheric pressure in chamber 96 received from outlet port 34. Thus, the combined force of tank pressure on central portion 53 and filler neck pressure on outer circumferential portion 56 is sufficient to depress or deform diaphragm 46 in opposition to spring 86, moving first valve assembly 44 away from its blocking position shown in FIG. 1 toward its venting position shown in FIG. 2. This increases the pressure on spring 86, assisting in holding second valve assembly 82 in its blocking position as shown in FIG. 2.

Diaphragm 46, when depressed in this fashion, simultaneously unseats from both the annular first valve seat 68 and the surrounding annular second valve seat 72. This allows fuel vapor in flow tube 64 to flow into intermediate annular chamber 54 and to pass to opening 74, from which the fuel vapor can flow through outlet tube 76 and opening 77 and then through outlet port 34 ultimately to reach outlet passageway 42 connected to vapor recovery canister 22.

Some fuel vapor from flow tube 64 will tend to flow through intermediate annular chamber 54 to reach outer circumferential chamber 78, bringing the pressure in outer circumferential chamber 78 up from filler neck pressure to tank pressure. Thus, while filler neck pressure initially actuates diaphragm 46 to unseat diaphragm 46 from valve seats 68, 72, it is tank pressure which thereafter acts to depress diaphragm 46 and therefore to move first valve assembly 44 to its venting position shown in FIG. 2.

During vehicle refueling, fuel cap 14 is removed from filler neck 12 as shown in FIG. 3 so that pressure in filler neck 12, and hence in signal passageway 40, is atmospheric. The pressure in outer circumferential chamber 78, and correspondingly at outer circumferential portion 56 of diaphragm 46, is thus also atmospheric. Likewise, the pressure at the underside of diaphragm 46 is atmospheric. First valve assembly 44 therefore remains in its blocking position as shown in FIG. 3.

When fuel vapor pressure in fuel tank 10 increases to a predetermined amount (for example, about 1 kPa), second valve assembly 82 is moved away from valve seat 84 against the bias of spring 86 to its venting position as shown in FIG. 3 allowing fuel vapor received from second inlet 30 to vent through interior region 26 to outlet port 34. Thus, advantageously, in this configuration, control valve 20 connects fill-limit valve 18 in fluid communication with vapor outlet 34 while blocking fuel vapor from run-loss valve 16 from venting to outlet port 34. That is, in this configuration, control valve 20 properly performs the Onboard Refueling Vapor Recovery (ORVR) and fill-limit functions without interference from run-loss valve 16.

It is contemplated that the ratio of the diameter of flow tube 64 to the diameter of diaphragm 46 will be kept relatively low. Of course, the diameter of flow tube 64 must be sufficient to handle the relatively large flow of fuel vapor exhausted through run-loss valve 16. However, because flow tube 64 conducts tank pressure to central portion 53 of diaphragm 46, as the flow tube diameter (and hence the central portion diameter) increases, there is a greater likelihood that the action of tank pressure on central portion 53 alone will move diaphragm 46 away from valve seats 68, 72 during refueling. By keeping the diameter ratio as low as possible, this potential problem can be avoided.

As shown in FIG. 3, flow tube 64 is an L-shaped member having a first leg 87 and a second leg 88. First leg 87 defines central chamber 52 and communicates with central portion 53 of diaphragm 46. Second leg 88 is longer than first leg 87 and has one end connecting to first leg 87 and another end communicating with first inlet port 38.

A vent conduit 89 is a connector that defines a bleed passageway 90 connecting second leg 88 of flow tube 64 in fluid communication with outer circumferential chamber 78 as shown in FIG. 3. Vent conduit 89 includes a gasket 71 mounted in a conduit passage 73 and formed to include bleed passageway 98. Illustratively, vent conduit 89 is arranged to lie in spaced-apart parallel relation to first leg 87 and in perpendicular relation to second leg 88. Pressurized fuel vapor accumulating in flow tube 64 is dissipated through bleed passageway 90 and discharged into outer circumferential chamber 78 and conducted through signal port 32 and signal passageway 40 toward filler neck 12.

In FIG. 3, a normal refueling condition is shown. In this case, tank 10 is venting to the vapor recovery canister 22 through fill-limit valve 18 along a path 38, 40 past second valve assembly 82. Liquid fuel is being introduced into filler neck 12 through a fuel-dispensing nozzle 91 while filler neck cap 14 is off. Some fuel vapor is venting through run-loss valve 16 into the fuel vapor control assembly 20 and passing through the bleed aperture 90 to reach the filler neck 12. This slight amount of bleed fuel vapor is reentrained into the liquid fuel 92 that is passing from the fuel-dispensing nozzle 91 into the filler neck 12.

Figure 4:
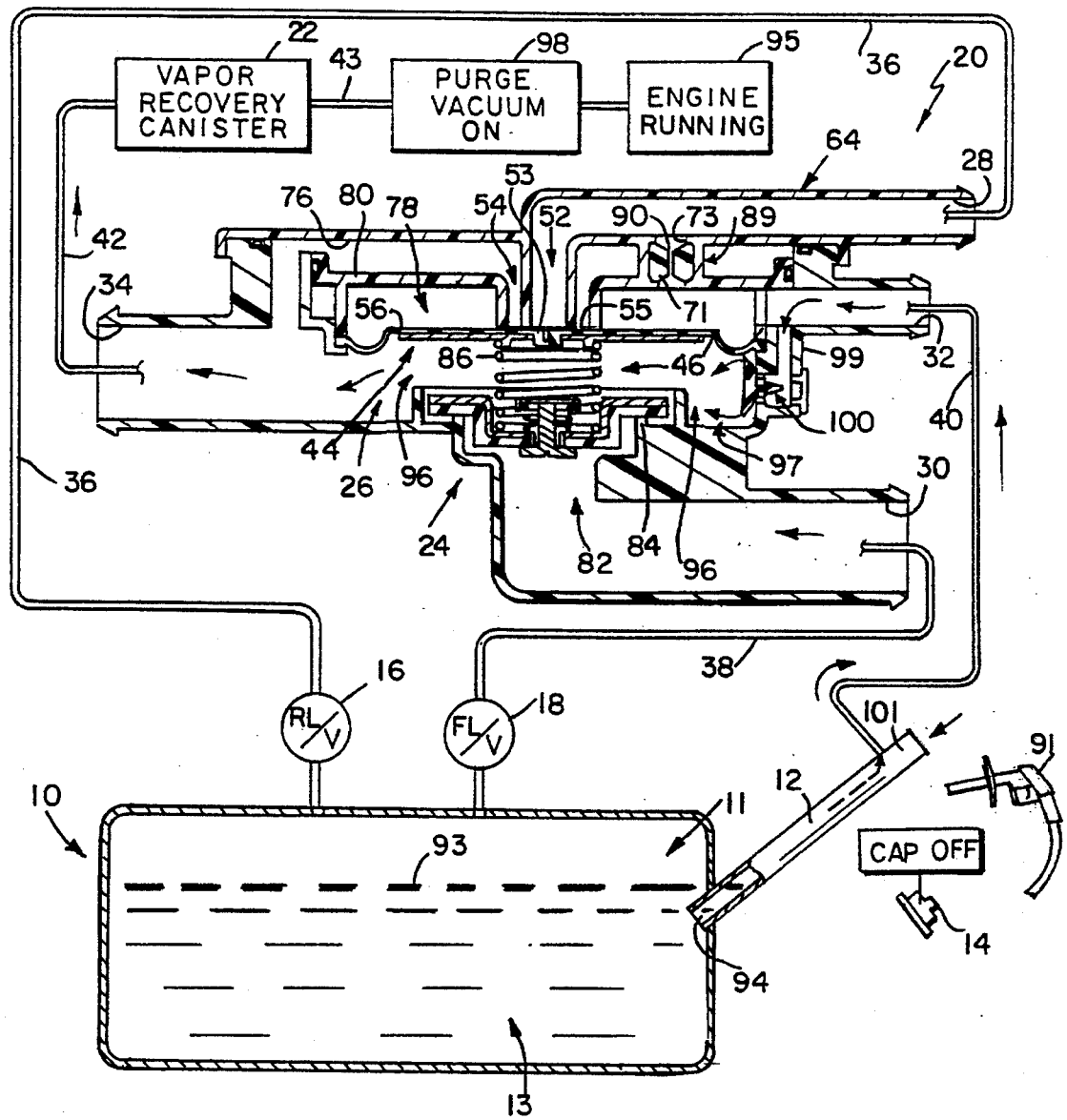
FIG. 4 is a view similar to FIGS. 1–3 showing an unusual situation just after tank refueling in which the vehicle engine is running, the filler neck cap is off the filler neck, and a vacuum-relief valve in the control valve is opened to allow ambient air admitted into the filler neck following refueling to be drawn into an interior region of the valve housing of the control valve to dissipate any vacuum condition created therein by a purge vacuum source coupled to the vapor recovery canister.

In FIG. 4, refueling has been completed and the level of liquid fuel 13 in tank 10 has risen to a level 93 closing off lower outlet 94 of the filler neck 12. In this unusual situation, cap 14 is still off of filler neck 12 and engine 95 is running. To counteract any vacuum that might otherwise develop in chamber 96 below diaphragm 46 inside interior region 26 of fuel vapor control assembly 20, which vacuum might act to move differential pressure valve 44 to a venting position, a one-way umbrella-type check valve 97 is positioned to relieve any vacuum that might develop inside chamber 96 in valve housing 24. Because engine 95 is running, an emission control system 98 is operating to apply "purge" vacuum to vapor recovery canister 22. In some cases, this purge vacuum might cause differential pressure valve 44 to move prematurely to an open venting position. To prevent this premature movement from occurring, a one-way umbrella-type check valve 97 is mounted to allow flow of fuel vapor or ambient air from the filler neck 12 through the signal passageway 40 and into the housing 24 through signal port 32 and past the one-way check valve 97. This venting shown in FIG. 4 dissipates any unwanted vacuum that might otherwise develop in chamber 96 inside housing 24 due to application of a purge vacuum to the vapor recovery canister 22 while engine 95 is running.

As shown in FIG. 4, a vacuum-relief tube 99 is formed to include a vacuum-relief passageway 100 interconnecting signal port 32 and chamber 96 in interior region 26 of valve housing 24. The vacuum-relief valve 97 is mounted in chamber 96 normally to cover an outlet of vacuum-relief passageway 100 as shown in FIGS. 1–3 and 5. Vacuum-relief valve 97 is movable to open the outlet of vacuum-relief passageway 100 as shown in FIG. 4 once a predetermined negative pressure develops in chamber 96. Essentially, vacuum-relief valve 97 is movable between positions shown in FIGS. 3 and 4 to regulate flow of ambient air from signal port 32 into chamber 96 in valve housing 24. Ambient air admitted into filler neck 12 through the open inlet mouth 101 of filler neck 12 following refueling and before installation of closure cap 14 on inlet mouth 101 of filler neck is conducted through signal passageway 40 and signal port 32 to chamber 96 in housing 24 through vacuum-relief passageway 100 so that any unwanted vacuum condition extant in chamber 96 is dissipated.

In FIG. 5, all refueling has been completed, the cap 14 has been reinstalled on the filler neck 12, and the engine 95 is off. No fuel vapor is venting from the tank 10 through fill-limit valve 18. However, some pressurized fuel vapor is venting from vapor space 11 in fuel tank 10 through run-loss valve 16, vapor inlet passageway 36, second leg 88 of flow tube 64, and bleed passageway 90 into outer circumferential chamber 78. Some of the pressurized fuel vapor in outer circumferential chamber 78 will then vent through signal port 32 and signal passageway 40 to an upper region inside the filler neck 12.

Venting pressurized fuel vapor from vapor space 11 to outer circumferential chamber 78 in the manner shown in FIGS. 5 and 5a helps to regulate fuel tank pressure in some systems. If lower outlet 94 of filler neck 12 is submerged in liquid fuel 13 at the completion of refueling as shown in FIG. 5, then low fuel vapor pressures in fuel tank 10 do not result in fuel vapor pressure near inlet mouth 101 of filler neck 12, due to pressure required to "lift" liquid fuel 13 in filler neck 12. Alternatively, if filler neck 12 includes a one-way inlet check valve of the type disclosed in Robert S. Harris' U.S. application Ser. No. 08/346,785, filed Nov. 30, 1994, and entitled "Fuel-Delivery Control System," any pressurized fuel vapor in fuel tank 10 will be unable to pass through filler neck 12 to reach inlet mouth 101 because of the flow blockage established by the one-way inlet check valve (not shown). Unless pressurized fuel vapor from fuel tank 10 can pass up through filler neck 12 and signal passageway 40 to reach outer circumferential chamber 78 and apply a downward force 41 to differential pressure diaphragm 56, there will be no satisfactory way to develop enough pressure to exert a downward force 41 of sufficient mangitude on differential pressure diaphragm 56 to move that diaphragm from the flow-blocking position closing flow tube 64 that is shown in FIG. 5 to the venting position opening flow tube 64 that is shown, for example, in FIG. 5a.

Advantageously, bleed passageway 90 functions to discharge pressurized fuel vapor from flow tube 64 (such pressurized fuel vapor was exhausted from fuel tank vapor space 11 and passed through run-loss valve 16, vapor inlet passageway 36, and first inlet port 28 to reach flow tube 64) into outer circumferential chamber 78 as shown in FIGS. 5 and 5a to cause differential pressure valve 56 to move from its flow-blocking position shown in FIG. 5 to its venting position shown in FIG. 5a. In this venting position, pressurized fuel vapor can be vented from fuel tank 10 to vapor recovery canister 22 through control valve 20 even though pressurized fuel tank vapor is unable to escape from fuel tank vapor space 11 through filler neck 12.

In use, when refueling is completed, cap 14 is installed on inlet mouth 101 of filler neck 12 and some evaporation of liquid fuel 13 in fuel tank 10 begins to occur. Both valve assemblies in control valve 20 are normally closed at this point so some pressurized fuel vapor vents from vapor space 11 in fuel tank 10 through run-loss valve 16, bleed passageway 90, outer circumferential chamber 78, and signal passageway 40 to an upper region (near 101) inside filler neck 12. Because cap 14 is installed on filler neck 12, pressurized fuel vapor in filler neck 12 cannot escape causing the pressure in outer circumferential chamber 78, signal line 40, and filler neck 12 to rise until it is equal to fuel tank pressure. This pressure equalization permits control valve 20 to function normally as it would if filler neck 12 were not blocked by a liquid fuel head (shown in FIG. 5) or a one-way inlet check valve (not shown).

Another embodiment of the invention is illustrated in FIG. 6, in which features having reference numbers similar to those in FIG. 1 perform the same or similar function as they perform in FIG. 1. A control valve 120 is shown in FIG. 6. In the embodiment of FIG. 6, a first valve assembly 144 includes a diaphragm 146. Control valve 120 includes a central chamber 152 corresponding to the central portion 153 of diaphragm 146, an intermediate annular chamber 154 corresponding to the intermediate annular portion 155 of diaphragm 46, and an outer circumferential chamber 178 corresponding to outer circumferential portion 156 of diaphragm 146.

However, in contrast to the embodiment of FIG. 1, central portion 153 is exposed to atmospheric pressure and intermediate portion 155 is exposed to fuel vapor pressure from fuel tank 10. In particular, flow tube 164 extends between first inlet port 128 and intermediate annular chamber 154 defined between the walls of flow tube 164 and between partitions 166 and 168. Outer circumferential chamber 178 is similar to chamber 78 in the embodiment of FIG. 1.

In FIG. 6a, a partial sectional view of control valve 120 is provided. As shown, central portion 153 of diaphragm 146 is exposed to atmospheric pressure received from outlet port 134 through opening 176. Flow tube 164 communicates with intermediate annular chamber 154. Wall 168 defines the border between outer circumferential chamber 178 and intermediate annular chamber 154.

Thus, in operation of the embodiment of FIG. 6 during operation of the vehicle, outer circumferential chamber 178 is once again exposed to fuel vapor pressure from filler neck 112, received via signal port 132. Intermediate annular chamber 154 is exposed to fuel vapor pressure from fuel tank received via first inlet port 128. The underside of diaphragm 146 is exposed to atmospheric pressure as in the embodiment of FIG. 1. The combined force of neck pressure on the outer circumferential portion 156 and tank pressure on intermediate portion 155 causes first valve assembly 144 to move away from its blocking position shown in FIG. 6 toward its venting position (not shown), unseating from valve seats 170, 172.

Advantageously, the shifting of flow tube 164 to extend to intermediate annular chamber 154 may be important to prevent diaphragm 146 from unseating improperly from valve seats 170, 172. Specifically, it is thought that fuel vapor will reach that part of outer circumferential portion 156 which is closest to signal port 132 and may act on that part of portion 156 disproportionately, causing diaphragm 146 to tip by moving away from one of valve seats 170, 172 prior to moving away from the other. It is thought that shifting flow tube 164 to an offset position as shown in FIG. 6 can assist in preventing this tipping problem.

Although the invention has been described and defined with reference to certain preferred embodiments, variations and modifications exist within the scope and spirit of the invention as described and defined in the following claims.

I claim:

1. An apparatus for controlling venting of fuel vapors from a vehicle fuel tank having a filler neck, the apparatus comprising a housing defining an interior region and being formed to include a first inlet port connecting the interior region in fluid communication with the fuel tank, a signal port connecting the interior region in fluid communication with the filler neck, and an outlet port, a first valve assembly disposed in the interior region and movable between a blocking position and a venting position, the first valve assembly including a central portion, an intermediate annular portion concentric with the central portion, and an outer circumferential portion, a flow tube connecting the first inlet port with the central portion to expose the central portion to fuel vapor from the fuel tank, an annular partition lying in spaced-apart relationship with the flow tube and cooperating therewith to define an intermediate annular chamber open to the outlet port to expose the intermediate portion to atmospheric pressure, the annular partition further cooperating with the housing to define an outer circumferential chamber open to the signal port to expose the outer circumferential portion to fuel vapor from the filler neck so that the first valve assembly is moved away from its blocking position toward its venting position in response to fuel vapor pressure received from the first inlet port and the signal port allowing flow of fuel vapor from the flow tube and the outer circumferential chamber to the intermediate annular chamber during vehicle operation, and vent means for defining a bleed passageway connecting the flow tube in fluid communication with the outer circumferential chamber so that pressurized fuel vapor accumulating in the flow tube is dissipated through the bleed passageway and discharged into the outer circumferential chamber and conducted through the signal port toward the filler neck.

2. The apparatus of claim 1, wherein the flow tube is an L-shaped member having a first leg communicating with the central portion and a second leg connecting to the first leg and communicating with the first inlet port and the vent means interconnects the second leg and the outer circumferential chamber in fluid communication.

3. The apparatus of claim 2, wherein the second leg is longer than the first leg.

4. The apparatus of claim 2, wherein the vent means includes a tube formed to include the bleed passageway and arranged to lie in spaced-apart parallel relation to the first leg and in perpendicular relation to the second leg.

5. The apparatus of claim 1, further comprising exhaust means for conducting fuel vapor from the outlet port to a fuel vapor recovery canister and means for selectively connecting the signal port in fluid communication with the interior region of the housing and the outlet port.

6. The apparatus of claim 5, wherein the connecting means includes a vacuum-relief tube formed to include a vacuum-relief passageway interconnecting the signal port and the interior region of the housing and a vacuum-relief valve mounted in the housing normally to cover the vacuum-relief passageway and movable to open and close the vacuum-relief passageway.

7. The apparatus of claim 5, further comprising air supply means for conducting ambient air admitted into the filler neck following refueling and before installation of a closure cap on an inlet mouth of the filler neck to the signal port so that ambient air is communicated to the interior region of the housing and the outlet port through the connecting means.

8. The apparatus of claim 7, wherein the connecting means includes a vacuum-relief passageway interconnecting the signal port and the interior region of the housing to communicate ambient air from the signal port to the interior region to dissipate any vacuum conditions developed in the interior region of the housing following refueling and before installation of the closure cap on the filler neck and a vacuum-relief valve mounted in the housing normally to cover the vacuum-relief passageway and movable to open and close the vacuum-relief passageway to regulate flow of ambient air from the signal port into the interior region of the housing.

9. The apparatus of claim 1, further comprising exhaust means for conducting fuel vapor from the outlet port to a fuel vapor recovery canister and applying a vacuum to the interior region of the housing through the outlet port to draw fuel vapor from the interior region of the housing toward the fuel vapor recovery canister, and air supply means for conducting ambient air admitted into the filler neck following refueling and before installation of a closure cap on an inlet mouth of the filler neck through the signal port to the interior region of the housing so that ambient air is communicated to the interior region of the housing and the outlet port through the signal port and any vacuum condition extant in the interior region of the housing is dissipated.

10. The apparatus of claim 9, wherein the air supply means includes a vacuum-relief tube communicating ambient air from the signal port to the interior region of the housing and a vacuum-relief valve regulating flow of ambient air through the vacuum-relief tube.

11. An apparatus for controlling venting of fuel vapors from a vehicle fuel tank having a filler neck, the apparatus comprising a housing defining an interior region and being formed to include a first inlet port connecting the interior region in fluid communication with the fuel tank, a signal port connecting the interior region in fluid communication with the filler neck, and an outlet port, a first valve assembly disposed in the interior region and movable between a blocking position and a venting position, the first valve assembly including a central portion, an intermediate annular portion concentric with the central portion, and an outer circumferential portion, a flow tube connecting the first inlet port with the central portion to expose the central portion to fuel vapor from the fuel tank, an annular partition lying in spaced-apart relationship with the flow tube and cooperating therewith to define an intermediate annular chamber open to the outlet port to expose the intermediate portion to atmospheric pressure, the annular partition further cooperating with the housing to define an outer circumferential chamber open to the signal port to expose the outer circumferential portion to fuel vapor from the filler neck so that the first valve assembly is moved away from its blocking position toward its venting position in response to fuel vapor pressure received from the first inlet port and the signal port allowing flow of fuel vapor from the flow tube and the outer circumferential chamber to the intermediate annular chamber during vehicle operation, and means for selectively connecting the signal port in fluid communication with the interior region and the outlet port.

12. The apparatus of claim 11, wherein the connecting means includes a vacuum-relief tube formed to include a vacuum-relief passageway interconnecting the signal port and the interior region and a vacuum-relief valve mounted in the housing normally to cover the vacuum-relief passageway and movable to open and close the vacuum-relief passageway.

13. The apparatus of claim 11, further comprising exhaust means for conducting fuel vapor from the outlet port to a fuel vapor recovery canister and air supply means for conducting ambient air admitted into the filler neck following refueling and before installation of a closure cap on an inlet mouth of the filler neck to the signal port so that ambient air is communicated to the interior region of the housing and the outlet port through the connecting means.

14. The apparatus of claim 13, wherein the connecting means includes a vacuum-relief passageway interconnecting the signal port and the interior region of the housing to communicate ambient air from the signal port to the interior region to dissipate any vacuum conditions developed in the interior region of the housing following refueling and before installation of the closure cap on the filler neck and a vacuum-relief valve mounted in the housing normally to cover the vacuum-relief passageway and movable to open and close the vacuum-relief passageway to regulate flow of ambient air from the signal port into the interior region of the housing.

15. The apparatus of claim 11, further comprising exhaust means for conducting fuel vapor from the outlet port to a fuel vapor recovery canister and applying a vacuum to the interior region of the housing through the outlet port to draw fuel vapor from the interior region of the housing toward the fuel vapor recovery canister, and air supply means for conducting ambient air admitted into the filler neck following refueling and before installation of a closure cap on an inlet mouth of the filler neck through the signal port so that ambient air is communicated to the interior region of the housing and the outlet port through the connecting means and any vacuum condition extant in the interior region of the housing is dissipated.

16. The apparatus of claim 15, wherein the air supply means includes a vacuum-relief tube communicating ambient air from the signal port to the interior region of the housing and a vacuum-relief valve regulating flow of ambient air through the vacuum-relief tube.

17. The apparatus of claim 11, wherein the flow tube is an L-shaped member having a first leg communicating with the central portion and a second leg connecting to the first leg and communicating with the first inlet port and further comprising a vent conduit interconnecting the second leg and the outer circumferential chamber in fluid communication.

18. The apparatus of claim 17, wherein the second leg is longer than the first leg.

19. The apparatus of claim 17, wherein the vent conduit is arranged to lie in spaced-apart parallel relation to the first leg and in perpendicular relation to the second leg.

20. An apparatus for controlling discharge of fuel vapors from a vehicle fuel tank having a filler neck, the apparatus comprising a housing defining an interior region and being formed to include a first inlet port connecting the interior region in fluid communication with the fuel tank and an outlet port, first conducting means for conducting fuel vapor from the fuel tank to the interior region, first valve means for selectively blocking flow of fuel vapors from the first conducting means through the interior region, the first valve means being movable in response to fuel vapor pressure received from the first conducting means between a blocking position preventing fuel vapor received from the first conducting means from flowing through the interior region to the outlet port and a venting position allowing fuel vapor received from the first conducting means to flow through the interior region to the outlet port, second conducting means for conducting fuel vapor from the fuel tank to the interior region, second valve means for selectively blocking flow of fuel vapors from the second conducting means to the interior region, the second valve means being movable in response to fuel vapor pressure received from the second conducting means between a blocking position blocking flow of fuel vapor from the second conducting means through the interior region to the outlet port when the first valve means is positioned in its venting position and a venting position allowing flow of fuel vapor from the second conducting means through the interior region to the outlet port when the first valve means is positioned in its blocking position, third conducting means for conducting fuel vapor from the filler neck to the first valve means to move the first valve means from its blocking position toward its venting position, the first valve means including a central portion, an intermediate portion concentric with the central portion, and an outer circumferential portion, an outlet tube extending between the central portion and the outlet port to expose the central portion to atmospheric pressure, a flow tube extending between the first inlet port and the intermediate portion to expose the intermediate portion to fuel vapor from the fuel tank, the flow tube extending into the interior region in spaced-apart relationship with the housing to define an outer circumferential chamber therebetween, the outer circumferential chamber being open to the filler neck through the third conducting means to expose the outer circumferential portion to fuel vapor from the filler neck so that the first valve means is moved away from its blocking position toward its venting position allowing flow of fuel vapor from the outer circumferential chamber to the outlet tube during vehicle operation, and vent means for defining a bleed passageway connecting the flow tube in fluid communication with the third conducting means so that pressurized fuel vapor accumulating in the flow tube is dissipated through the bleed passageway and discharged into the outer circumferential chamber and conducted through the third conducting means toward the filler neck.

21. The apparatus of claim 20, wherein the flow tube is an L-shaped member having a first leg communicating with the intermediate portion and a second leg connecting to the first leg and communicating with the outlet port and the vent means interconnects the second leg and the outer circumferential chamber in fluid communication.

22. The apparatus of claim 21, wherein the second leg is longer than the first leg.

23. The apparatus of claim 21, wherein the vent means includes a tube formed to include the bleed passageway and arranged to lie in spaced-apart parallel relation to the first leg and in perpendicular relation to the second leg.

24. The apparatus of claim 20, further comprising fourth conducting means for conducting fuel vapor from the outlet port to a fuel vapor treatment canister away from the housing and means for selectively connecting the third conducting means in fluid communication with the interior region and the fourth conducting means.

25. The apparatus of claim 24, wherein the connecting means includes a vacuum-relief tube formed to include a vacuum-relief passageway interconnecting the third conducting means and the interior region and a vacuum-relief valve mounted in the housing normally to cover the vacuum-relief passageway and movable to open and close the vacuum-relief passageway.

26. An apparatus for controlling venting of fuel vapors from a vehicle fuel tank having a filler neck, the apparatus comprising a housing defining an interior region and being formed to include a first inlet port connecting the interior region in fluid communication with the fuel tank, a signal port connecting the interior region in fluid communication with the filler neck, and an outlet port, a first valve assembly disposed in the interior region and movable between a blocking position preventing fuel vapor received from the first inlet port from flowing through the interior region to the outlet port and a venting position allowing fuel vapor received from the first inlet port to flow through the interior region to the outlet port, the first valve assembly including a central portion, an intermediate portion concentric with the central portion, and an outer circumferential portion, an outlet tube extending between the central portion and the outlet port to expose the central portion to atmospheric pressure, a flow tube extending between the first inlet port and the intermediate portion to expose the intermediate portion to fuel vapor from the fuel tank, the flow tube extending into the interior region in spaced-apart relationship with the housing to define an outer circumferential chamber therebetween, the outer circumferential chamber being open to the signal port to expose the outer circumferential portion to fuel vapor from the filler neck so that the first valve assembly is moved away from its blocking position toward its venting position in response to fuel vapor pressure received from the first inlet port and the signal port allowing flow of fuel vapor from the flow tube and the outer circumferential chamber to the outlet tube during vehicle operation, and vent means for defining a bleed passageway connecting the flow tube in fluid communication with the outer circumferential chamber so that pressurized fuel vapor accumulating in the flow tube is dissipated through the bleed passageway and discharged into the outer circumferential chamber and conducted through the signal port toward the filler neck.

27. The apparatus of claim 26, wherein the flow tube is an L-shaped member having a first leg communicating with the intermediate portion and a second leg connecting to the first leg and communicating with the first inlet port and the vent means interconnects the second leg and the outer circumferential chamber in fluid communication.

28. The apparatus of claim 27, wherein the second leg is longer than the first leg.

29. The apparatus of claim 27, wherein the vent means includes a tube formed to include the bleed passageway and arranged to lie in spaced-apart parallel relation to the first leg and in perpendicular relation to the second leg.

30. The apparatus of claim 26, further comprising means for conducting fuel vapor from the outlet port to a fuel vapor recovery canister and means for selectively connecting the signal port in fluid communication with the interior region and the outlet port.

31. The apparatus of claim 30, wherein the connecting means includes a vacuum-relief tube formed to include a vacuum-relief passageway interconnecting the signal port and the interior region and a vacuum-relief valve mounted in the housing normally to cover the vacuum-relief passageway and movable to open and close the vacuum-relief passageway.

32. An apparatus for controlling discharge of fuel vapors from a vehicle fuel tank having a filler neck, the apparatus comprising a housing defining an interior region and being formed to include an outlet port, first conducting means for conducting fuel vapor from the fuel tank to the interior region, first valve means for selectively blocking flow of fuel vapors from the first conducting means through the interior region, the first valve means being movable in response to fuel vapor pressure received from the first conducting means between a blocking position preventing fuel vapor received from the first conducting means from flowing through the interior region to the outlet port and a venting position allowing fuel vapor received from the first conducting means to flow through the interior region to the outlet port, second conducting means for conducting fuel vapor from the fuel tank to the interior region, second valve means for selectively blocking flow of fuel vapors from the second conducting means to the interior region, the second valve means being movable in response to fuel vapor pressure received from the second conducting means between a blocking position blocking flow of fuel vapor from the second conducting means through the interior region to the outlet port when the first valve means is positioned in its venting position and a venting position allowing flow of fuel vapor from the second conducting means through the interior region to the outlet port when the first valve means is positioned in its blocking position, third conducting means for conducting fuel vapor from the filler neck to the first valve means to move the first valve means from its blocking position toward its venting position, the first valve means including a central portion, an intermediate portion concentric with the central portion, and an outer circumferential portion, an outlet tube extending between the central portion and the outlet port to expose the central portion to atmospheric pressure, a flow tube extending between the first conducting means and the intermediate portion to expose the intermediate portion to fuel vapor from the fuel tank, the flow tube extending into the interior region in spaced-apart relationship with the housing to define an outer circumferential chamber therebetween, the outer circumferential chamber being open to the third conducting means to expose the outer circumferential portion to fuel vapor from the filler neck so that the first valve means is moved away from its blocking position toward its venting position allowing flow of fuel vapor from the outer circumferential chamber to the outlet tube during vehicle operation, and fourth conducting means for conducting fuel vapor from the outlet port to a fuel vapor treatment canister, and means for selectively connecting the third conducting means in fluid communication with the interior region and the fourth conducting means.

33. The apparatus of claim 32, wherein the connecting means includes a vacuum-relief tube formed to include a vacuum-relief passageway interconnecting the third conducting means and the interior region and a vacuum-relief valve mounted in the housing normally to cover the vacuum-relief passageway and movable to open and close the vacuum-relief passageway.

34. An apparatus for controlling venting of fuel vapors from a vehicle fuel tank having a filler neck, the apparatus comprising a housing defining an interior region and being formed to include a first inlet port connecting the interior region in fluid communication with the fuel tank, a signal port connecting the interior region in fluid communication with the filler neck, and an outlet port, a first valve assembly disposed in the interior region and movable between a blocking position preventing fuel vapor received from the first inlet port from flowing through the interior region to the outlet port and a venting position allowing fuel vapor received from the first inlet port to flow through the interior region to the outlet port, the first valve assembly including a central portion, an intermediate portion concentric with the central portion, and an outer circumferential portion, an outlet tube extending between the central portion and the outlet port to expose the central portion to atmospheric pressure, a flow tube extending between the first inlet port and the intermediate portion to expose the intermediate portion to fuel vapor from the fuel tank, the flow tube extending into the interior region in spaced-apart relationship with the housing to define an outer circumferential chamber therebetween, the outer circumferential chamber being open to the signal port to expose the outer circumferential portion to fuel vapor from the filler neck so that the first valve assembly is moved away from its blocking position toward its venting position in response to fuel vapor pressure received from the first inlet port and the signal port allowing flow of fuel vapor from the flow tube and the outer circumferential chamber to the outlet tube during vehicle operation, and means for selectively connecting the signal port in fluid communication with the interior region and the outlet port.

35. The apparatus of claim 34, wherein the connecting means includes a vacuum-relief tube formed to include a vacuum-relief passageway interconnecting the signal port and the interior region and a vacuum-relief valve mounted in the housing normally to cover the vacuum-relief passageway and movable to open and close the vacuum-relief passageway.

* * * * *